(12) United States Patent
Xu

(10) Patent No.: US 8,307,075 B2
(45) Date of Patent: Nov. 6, 2012

(54) METHOD, SYSTEM AND GAME SERVER FOR RECOMMENDING GAME ROOM

(75) Inventor: Gaoqian Xu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 177 days.

(21) Appl. No.: 12/893,655

(22) Filed: Sep. 29, 2010

(65) Prior Publication Data

US 2011/0022709 A1 Jan. 27, 2011

Related U.S. Application Data

(63) Continuation of application No. PCT/CN2009/072854, filed on Jul. 21, 2009.

(30) Foreign Application Priority Data

Jul. 28, 2008 (CN) .......................... 2008 1 0134619

(51) Int. Cl.
G06F 15/173 (2006.01)
G06F 15/16 (2006.01)
(52) U.S. Cl. ......... 709/224; 709/232; 709/233; 709/219
(58) Field of Classification Search .................. None
See application file for complete search history.

(56) References Cited

U.S. PATENT DOCUMENTS

| 6,304,902 B1 * | 10/2001 | Black et al. .................. 709/223 |
| 6,345,297 B1 * | 2/2002 | Grimm et al. ................. 709/227 |
| 6,390,922 B1 * | 5/2002 | Vange et al. .................... 463/42 |
| 2004/0215756 A1 * | 10/2004 | VanAntwerp et al. ........ 709/223 |
| 2007/0191101 A1 | 8/2007 | Coliz et al. |

FOREIGN PATENT DOCUMENTS

| CN | 1486019 A | 3/2004 |
| CN | 101126991 A | 2/2008 |
| CN | 101325559 A | 12/2008 |
| JP | 2008-073183 | 4/2008 |

OTHER PUBLICATIONS

First Chinese Office Action for Application No. 031143059, dated Feb. 12, 2010.

* cited by examiner

*Primary Examiner* — John B. Walsh
(74) *Attorney, Agent, or Firm* — Marshall, Gerstein & Borun LLP

(57) ABSTRACT

A method, system and game server for recommending a game room are disclosed. The method includes: a speed measuring server measuring a network speed from a network user logging on an IDC in which the speed measuring server is located to the IDC, counting an average of network speeds from all network users in a same subnet to the IDC; the speed measuring server sending the average of network speeds to a QoS center, the QoS center allocating, according to the average of network speeds and a predetermined principle, a QoS level to a communication link from each subnet to each IDC, sending the QoS level to a game server in each IDC; and the game server sending information of a recommended game room to a game client according to the QoS level of the communication link from the subnet to which the game client belongs to each IDC.

10 Claims, 3 Drawing Sheets

METHOD, SYSTEM AND GAME SERVER FOR RECOMMENDING GAME ROOM

CROSS-REFERENCE TO RELATED APPLICATIONS

This is a continuation of International Application No. PCT/CN2009/072854 filed Jul. 21, 2009, which in turn claims the priority benefit of Chinese Patent Application No. 200810134619.6 filed Jul. 28, 2008, the entire respective disclosures of which are incorporated herein by reference.

FIELD OF THE INVENTION

The present invention relates to Internet technologies, and more particularly to a method, system and a game server for recommending a game room.

BACKGROUND OF THE INVENTION

Network games are a type of network services, to which Internet users pay much attention. An Internet user needs to first log on a game room, and then enters a network game. The game room is configured in a game server. One game server may include multiple game rooms, and if the Internet user logs on the game room, it is indicated that the Internet user logs on the game server to which the game room belongs.

As well known, network speed is important for the experience of playing a network game by the Internet user, and the faster the network speed is, the better the experience is.

At present, factors affecting the network speed mainly include a location of an Internet user when the Internet user logs on a game room, an Internet Server Provider (ISP) and an Internet Data Center (IDC) which are adopted by a game server to which the game room belongs. The IDC is provided by each ISP, a game operator usually commits game servers of the game operator to the IDC, and provides services for network users at the IDC. If a network user logs on the game server in the IDC, it is indicated that the network user logs on the IDC.

Network users, whose physical locations of IP information are the same and home ISPs are the same, belong to the same subnet. Usually, a speed between subnets belonging to the same ISP is faster than a speed between subnets belonging to different ISPs. For example, a subnet in which a certain network user is currently located belongs to a first ISP, and there are a first game room configured in an IDC of the first ISP and a second game room configured in an IDC of a second ISP; usually a faster network speed can be obtained if the network user logs on the first game room to perform a game rather than logs on the second game room to perform the game. Usually, a network speed between a network user and an IDC which are geographically closer to each other is faster than that between a network user and an IDC which are geographically farther to each other, e.g. a faster network speed can be obtained if a network user in Shanghai logs on a game room of an IDC in an east china area rather than logs on a game room of an IDC in Shenzhen.

Therefore, in the prior art, an ISP to which each game room belongs and a geographical location of an IDC to which each game room belongs may be displayed to the network user, and then the network user selects a game room to be logged on according to the ISP and the geographical location of the IDC. In the method, the network user needs to learn specialty knowledge about effect of the ISP and the geographical location of the IDC on the network speed, and thus the method is not intuitionistic for the network user; moreover, the effect does not always exist, e.g. network congestion may happen when network users logging on the IDC in Shenzhen at certain time are so many, then a faster network speed can be obtained if a network user in Shenzhen selects the IDC in the east china area rather than logs on the IDC in Shenzhen, but the network user can not learn a real network speed from the network user to each IDC.

The prior art provides a method to solve the above deficiencies, in which a network game client measures a network speed from the network game client to each IDC, and displays a measurement result to the network user.

As can be seen, the method in which the network game client measures the network speed does not require that the network user learns the specialty knowledge about the effect of the ISP and the geographical location of the IDC on the network speed, and the method is intuitionistic for the network user; moreover, a real network speed from the network game client to each IDC can be measured. However, the measurement is initiated by each network game client and usually is single time measurement, the network speed obtained by the measurement has large randomicity, and an accidental factor has a great effect on the recommending of a game room.

SUMMARY OF THE INVENTION

In view of the above, embodiments of the present invention provide a method, system and game server for recommending a game room, to eliminate an effect of an accidental factor on recommending of a game room.

Technical schemes of the embodiments of the present invention are implemented as follows.

A method for recommending a game room includes:
measuring, by at least one speed measuring server, a network speed from a network user logging on an IDC in which the speed measuring server is located to the IDC, and counting an average of network speeds from all network users in a same subnet to the IDC;

sending, by the speed measuring server, the average of the network speeds to a QoS center; allocating, by the QoS center, according to the average of the network speeds from all network users in each subnet to each IDC and a predetermined principle of allocating QoS levels, a QoS level to a communication link from each subnet to each IDC, and sending the QoS level of the communication link from each subnet to each IDC to a game server in each IDC; and determining, by the game server, a subnet to which a game client logging on the game server belongs, and sending information of a recommended game room according to the determined subnet and the QoS level of the communication link from each subnet to each IDC.

A system for recommending a game room includes: at least one speed measuring server, a QoS center and at least one game server; wherein the speed measuring server is configured in an IDC, and is adapted to measure a network speed from a network user logging on the IDC to the IDC, count an average of network speeds from all network users in a same subnet to the IDC, and send the average of network speeds to the QoS center;

the QoS center is adapted to, according to the average of network speeds from all network users in each subnet to each IDC and a predetermined principle of allocating QoS levels, allocate a QoS level to a communication link from each subnet to each IDC, and send the QoS level of the communication link from each subnet to each IDC to the game server in each IDC; and the game server is adapted to determine a subnet to which a game client logging on the game server belongs, and send information of a recommended game room according to the determined subnet and the QoS level of the communication link from each subnet to each IDC.

A game server for recommending a game room includes: a QoS level storing module and a game room recommending module; and the QoS level storing module is adapted to receive and store a QoS level of a communication link from each subnet to each IDC; and the game room recommending module is adapted to receive a request of obtaining a game room list from a game client, and identify each game room with a QoS level according to a subnet to which the game client belongs, the IDC to which each game room belongs and the QoS level of the communication link from each subnet to each IDC, and send the game room list in which game rooms are identified with QoS levels to the game client.

As can be seen, in the embodiments of the present invention, the speed measuring server in each IDC measures the network speed from the network user logging the IDC to the IDC, counts the average of network speeds from all network users in the same subnet to the IDC, and sends the average of network speeds to the QoS center, the QoS center, according to the average of network speeds from all network users in each subnet to each IDC and a predetermined principle, allocates the QoS level to the communication link from each subnet to each IDC, and sends the QoS level to the game server, and the game server recommends a game room for the game client according to the subnet in which the game client logging on the game server is located and the QoS level of the communication link from each subnet to each IDC. Since the speed measuring server is configured to measure the average of network speeds from all network users in each subnet to each IDC, and the QoS center allocates the QoS level to the communication link from each subnet to each IDC according to the average of network speeds from all network users in each subnet to each IDC, the effect of an accidental factor on the recommending of the game room can be eliminated when the game server recommends the game room for the game client according to the QoS level.

DETAILED DESCRIPTION OF THE INVENTION

In embodiments of the present invention, an average of network speeds from all network users in each subnet to each IDC is measured through a QoS measuring platform, and a QoS level is allocated to a communication link from each subnet to each IDC according to the average of network speeds and a predetermined principle of allocating QoS levels, and the QoS level is sent to a game server. After determining a subnet in which a certain game client is located, the game server recommends a game room to the game client according to the determined subnet and the QoS level. The QoS level indicates a communication quality of the communication link from the subnet to the IDC. The game client may be narrow-sense client software operated in a Personal Computer (PC), or a client with a web page form, or a client operated in a wireless device such as a mobile telephone. The client with a web page form transfers data to the game server through a server, and the client operated in a wireless device communicates with the game server through a network side device such as a base station.

The QoS measuring platform includes a speed measuring server and a QoS center. The speed measuring server is configured in the IDC, and is adapted to measure the average of network speeds from all network users in each subnet to the speed measuring server, and report the average of network speeds to the QoS center, and the QoS center is adapted to, according to the average of network speeds from all network users in each subnet to each IDC and the predetermined principle, allocate the QoS level to the communication link from each subnet to each IDC, and send the QoS level to the game server.

In order to make the object, technical schemes and merits clearer, the present invention is described hereinafter in detail with reference to the accompany drawings and embodiments.

Figure 1:
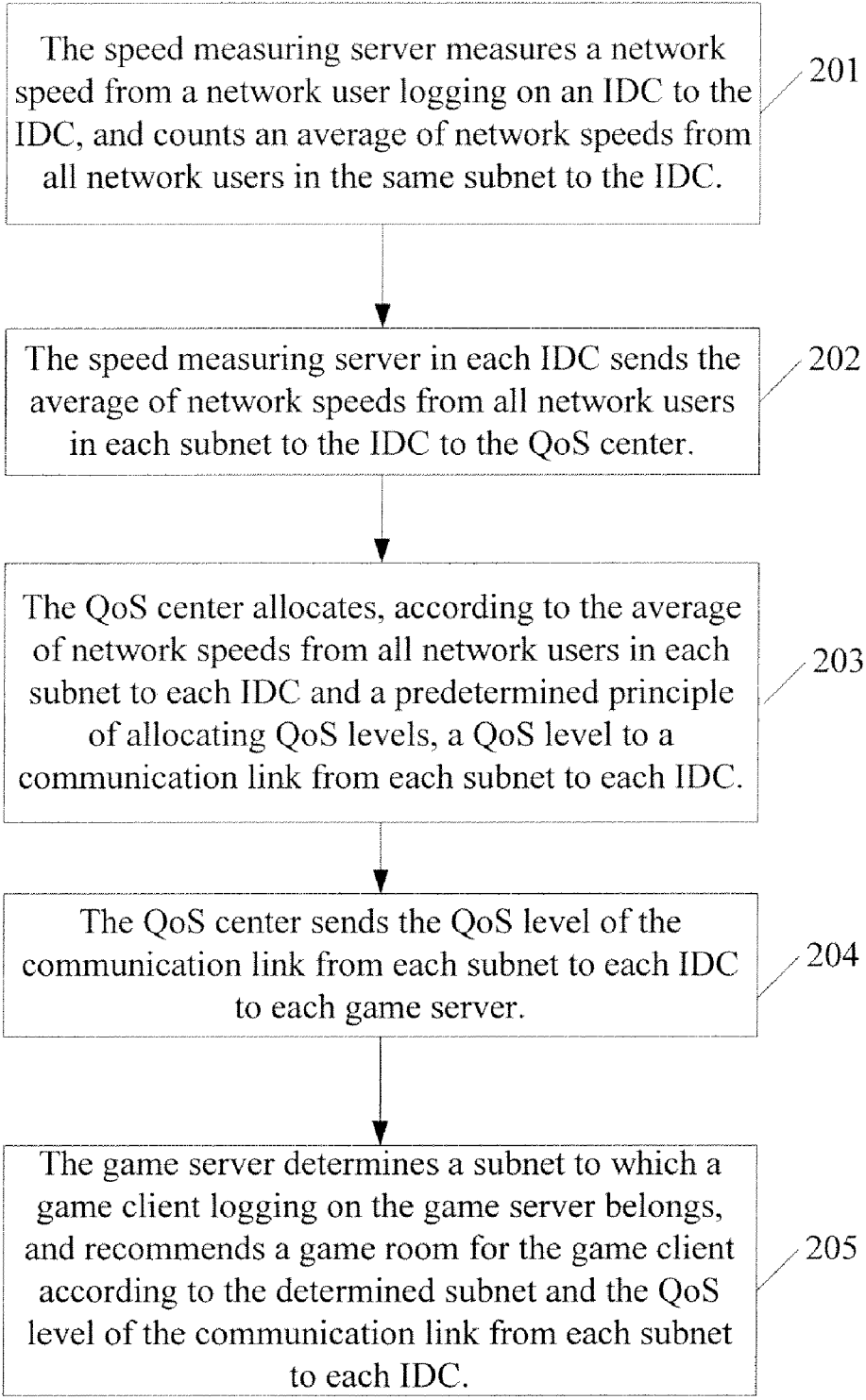
FIG. 1 is flowchart illustrating a method for recommending a game room according to an embodiment of the present invention.

FIG. 1 is flowchart illustrating a method for recommending a game room according to an embodiment of the present invention. As shown in FIG. 1, the method includes the following steps.

Step 201: A speed measuring server measures a network speed from a network user logging on an IDC to the IDC, and counts an average of network speeds from all network users in the same subnet to the IDC.

In this step, the speed measuring server is configured in the IDC in advance. A network server in the IDC stores, according to a predetermined protocol, a specific file for measuring a network speed. The network user accesses the speed measuring server in each IDC according to the specific file after logging on the network server, and obtains a file for measuring the network speed from the speed measuring server. The speed measuring server counts average consumed time of obtaining the file for measuring the network speed by all network users in the same subnet, and calculates an average of network speeds from all network users in the subnet to the IDC in which the speed measuring server is located according to the size of the file for measuring the network speed and the average consumed time; in this way, the speed measuring server in each IDC may obtain the average of network speeds from all network users in each subnet to the IDC.

In this step, the subnet to which the network user belongs may be determined according to IP information used when the network user logs on the network server. Specifically, the subnet to which the network user belongs is identified by a physical location of IP information of each network user logging on the IDC and a home ISP.

Step 202: The speed measuring server in each IDC sends the average of network speeds from all network users in each subnet to the IDC to the QoS center.

The QoS center in this step is also configured in advance, and has a communication connection with each speed measuring server; each speed measuring server sends the QoS center the average of network speeds from all network users in each subnet to the IDC in which the speed measuring server is located through the communication connection, and thus the QoS center stores the average of network speeds from all network users in each subnet to each IDC.

Step 203: The QoS center allocates, according to the average of network speeds from all network users in each subnet to each IDC and a predetermined principle of allocating QoS levels, a QoS level to a communication link from each subnet to each IDC.

In this step, the predetermined principle includes that: the QoS center allocates the QoS level to the communication link from each subnet to each IDC according to a fast-to-slow sequence of the average of network speeds from all network users in each subnet to each IDC. Each QoS level corresponds to a network speed interval, and when the network speed is calculated according to the average consumed time of obtaining the file for measuring the network speed by the network user and the size of the file, each QoS level corresponds to an average consumed time interval.

In order to be convenient for the network user to select, according to the QoS level, a game room recommended by the game server, the configuration of the QoS level should not be too complex, e.g. only three QoS levels are configured an average consumed time interval corresponding to the first QoS level is less than 163 ms, an average consumed time interval corresponding to the second QoS level is between 163 ms and 260 ms (including end values), and an average consumed time interval corresponding to the third QoS level is more than 260 ms.

In this step, the predetermined principle may also include that: the QoS center allocates the QoS level to the communication link from each subnet to each IDC according to the average of network speeds from all network users in each subnet to each IDC and an offline rate and/or network delay from the subnet to which the game client belongs to the game room in each IDC. The offline rate and/or network delay are measured by the game client and are reported to the QoS center, and the game client may directly reports the offline rate and/or network delay to the QoS center, and may also reports the offline rate and/or network delay to the QoS center through the speed measuring server.

The QoS levels allocated by the QoS center and the predetermined principle of allocating the QoS levels may be dynamically modified according to a network state from each subnet to each IDC. For example, in a certain time interval, the QoS level of a communication link from the first subnet to the first IDC is higher, and complaints of network users belonging to the first subnet to the first IDC is more, then the predetermined principle of allocating the QoS levels is unreasonable and needs to be modified, or there is an abnormal state in the communication link from the first subnet to the first IDC and it is needed to decrease the QoS level of the communication link from the first subnet to the first IDC. When the predetermined principle is allocating the QoS levels according to a formula or a threshold range, the QoS center may modify the predetermined principle by modifying the formula or the threshold range. The QoS center may store the QoS level of the communication link from each subnet to each IDC in a database, and thus may modify the QoS level by modifying the database.

Step 204: The QoS center sends the QoS level of the communication link from each subnet to each IDC to each game server.

Each game server in this step may also be configured in the IDC. The QoS center establishes a communication connection with each game server, and sends the QoS level of the communication link from each subnet to each IDC to each game server through the communication connection.

Step 205: The game server determines a subnet to which a game client logging on the game server belongs, and recommends a game room for the game client according to the determined subnet and a QoS level of the communication link from each subnet to each IDC.

The game server determines the subnet to which the game client belongs according to IP information of the game client, specifically, determines the subnet to which the game client belongs according to a physical location of the IP information and a home ISP.

After determining the subnet to which the game client belongs, the game server may select an IDC, where a communication link from the subnet to the IDC has a higher QoS level, and recommends a game room of a game server configured in the IDC for the game client; or the game server may issue all QoS levels from the subnet to all IDCs to the game client, and identifies the QoS level of each game room in the game client, so that the network user may select a game room. Specifically, the game server receives a request of obtaining a game room list from the game client, identifies the QoS level of each game room according to a subnet to which the game client belongs, the IDC to which each game room belongs and the QoS level of the communication link from each subnet to each IDC, and sends the game room list in which game rooms are identified with QoS levels to the game client.

The game server first determines the subnet to which the game client belongs before recommending the game room for the game client, and then only issues the QoS level of the communication link from the subnet to which the game client belongs to each IDC to the game client, but does not issue QoS levels of communication links from other subnets to each IDC, thereby decreasing information flow and the load of the game server.

Figure 2:
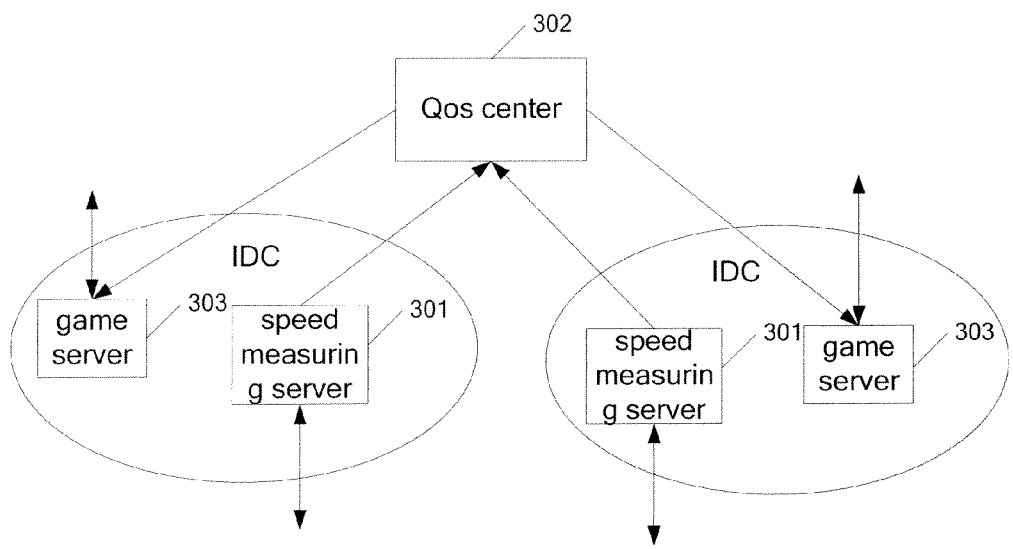
FIG. 2 is a structure diagram of a first system for recommending a game room according to an embodiment of the present invention.

FIG. 2 is a structure diagram of a first system for recommending a game room according to an embodiment of the present invention. The system includes a speed measuring server 301, a QoS center 302 and a game server 303.

The speed measuring server 301 is configured in an IDC and is adapted to measure a network speed from a network user logging on the IDC to the IDC, count an average of network speeds from all network users in the same subnet to the IDC, and send the average of network speeds to the QoS center 302.

The QoS center 302 is adapted to, according to the average of network speeds from all network users in each subnet to each IDC and a predetermined principle of allocating QoS levels, allocate a QoS level to a communication link from each subnet to each IDC, and send the QoS level of the communication link from each subnet to each IDC to the game server 303 in each IDC.

The game server 303 is adapted to determine a subnet to which a game client logging on the game server 303 belongs, and recommends a game room for the game client according to the determined subnet and the QoS level of the communication link from each subnet to each IDC.

Figure 3:
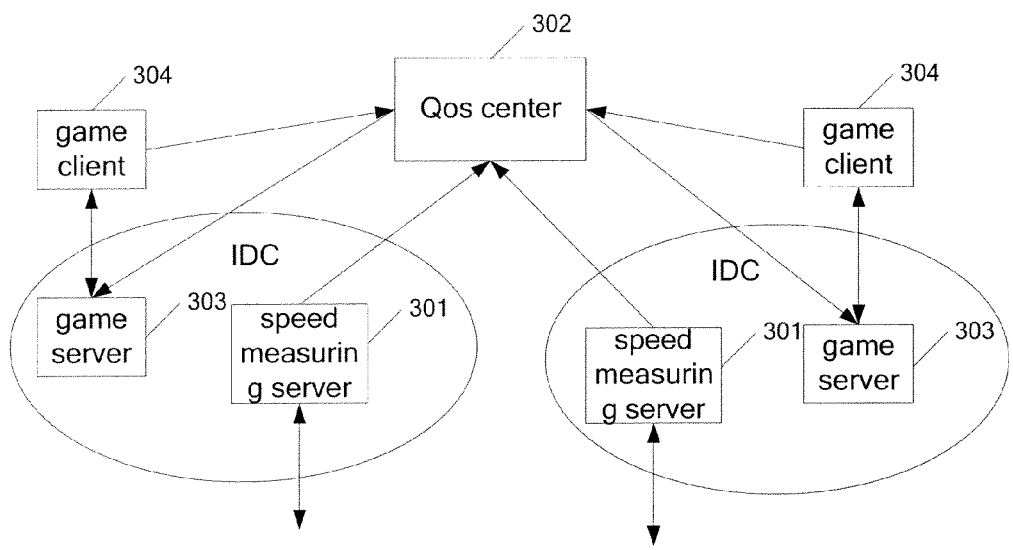
FIG. 3 is a structure diagram of a second system for recommending a game room according to an embodiment of the present invention.

FIG. 3 is a structure diagram of a second system for recommending a game room according to an embodiment of the present invention. As shown in FIG. 3, the system further includes a game client 304 on the base of FIG. 2.

The game client 304 is adapted to report an offline rate and/or network delay from the game client 304 to the game server of each IDC to the QoS center 302.

The QoS center 302 is adapted to allocate a QoS level to the communication link from the subnet to each IDC according to the average of network speeds from all network users in each subnet to each IDC, the offline rate and/or network delay from game clients belonging to the same subnet to the game room of each IDC.

The game server 303 is further adapted to receive a request of obtaining a game room list from the game client, and identify each game room with a QoS level according to a subnet to which the game client 304 belongs, the IDC to which each game room belongs and the QoS level of the communication link from each subnet to each IDC, and send the game room list in which game rooms are identified with QoS levels to the game client.

The QoS center 302 is further adapted to modify the predetermined principle and/or the QoS levels.

Figure 4:
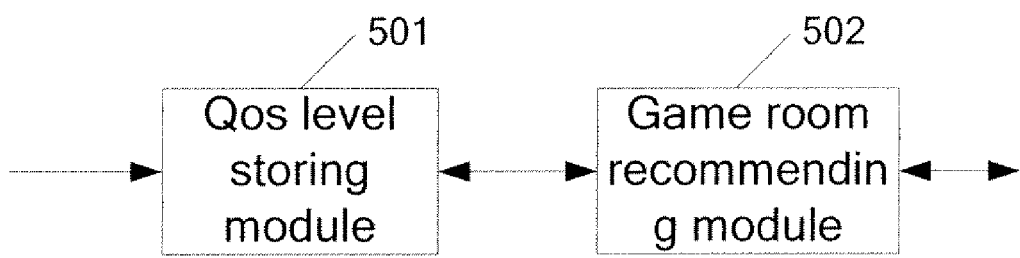
FIG. 4 is a structure diagram of a game server for recommending a game room according to an embodiment of the present invention.

FIG. 4 is a structure diagram of a game server for recommending a game room according to an embodiment of the present invention. The game server includes a QoS level storing module 501 and a game room recommending module 502.

The QoS level storing module 501 is adapted to receive and store a QoS level of a communication link from each subnet to each IDC.

The game room recommending module is adapted to receive a request of obtaining a game room list from a game client, and identify each game room with a QoS level according to a subnet to which the game client belongs, the IDC to which each game room belongs and the QoS level of the communication link from each subnet to each IDC, and send the game room list in which game rooms are identified with QoS levels to the game client.

As can be seen from the above schemes, in the embodiments of the present invention, since the QoS measuring platform is configured to measure the average of network speeds from all network users in each subnet to each IDC, and the QoS level is allocated to the communication link from each subnet to each IDC according to the average of network speeds, the effect of an incidental factor on the recommending of the game room can be eliminated when the game server recommends the game room for the game client according to the QoS level.

When the QoS levels are allocated according to the average of network speeds and the offline rate and/or network delay reported by the game client, the QoS levels can roundly reflect current network states, so as to recommend the game room with better network quality for the network user.

Moreover, in the embodiments of the present invention, the server side implements the recommending of the game room, and the server can be adaptable to different network states by dynamically adjusting QoS levels or the principle of allocating QoS levels, so as to recommend the game room with a better network quality for the network user when the network state changes.

The foregoing are only preferred embodiments of the present invention and are not for use in limiting the protection scope thereof. Any modification, equivalent replacement and improvement made within the technical scope of the present invention by the skilled person should be included in the protection scope thereof.

What is claimed:

1. A method for recommending a game room, comprising:
    measuring, by at least one speed measuring server, a network speed from a network user logging on an Internet Data Center (IDC) in which the speed measuring server is located to the IDC, and counting an average of network speeds from all network users in a same subnet to the IDC;
    sending, by the speed measuring server, the average of the network speeds to a Quality of Service (QoS) center; allocating, by the QoS center, according to the average of the network speeds from all network users in each subnet to each IDC and a predetermined principle of allocating QoS levels, a QoS level to a communication link from each subnet to each IDC, and sending the QoS level of the communication link from each subnet to each IDC to a game server in each IDC; and
    determining, by the game server, a subnet to which a game client logging on the game server belongs, and sending information of a recommended game room according to the determined subnet and the QoS level of the communication link from each subnet to each IDC.

2. The method of claim 1, further comprising:
    reporting, by the game client, to the QoS center on at least one of an offline rate and a network delay from the game client to the game server in each IDC;
    the predetermined principle of allocating QoS levels comprises: allocating, by the QoS center, the QoS level to the communication link from each subnet to each IDC according to the average of network speeds from all network users in the subnet to the game server in each IDC and the at least one of the offline rate and the network delay.

3. The method of claim 1, wherein sending information of a recommended game room comprises:
    receiving, by the game server, a request of obtaining a game room list from the game client, and identifying each game room with a QoS level according to a subnet to which the game client belongs, the IDC to which each game room belongs and the QoS level of the communication link from each subnet to each IDC; and
    sending, by the game server, the game room list in which each game room is identified with the QoS level to the game client, or recommending the game room of which QoS level meets a predetermined condition to the game client.

4. The method of claim 1, further comprising:
    modifying dynamically at least one of the predetermined principle and the QoS level according to a network state from each subnet to each IDC.

5. The method of claim 1, wherein the subnet is identified with a physical location of IP information of each network user logging on the IDC and a home Internet Server Provider (ISP).

6. A system for recommending a game room, comprising at least one speed measuring server, a Quality of Service (QoS) center and at least one game server; wherein
    the speed measuring server is configured in an Internet Data Center (IDC), and is adapted to measure a network speed from a network user logging on the IDC to the IDC, count an average of network speeds from all network users in a same subnet to the IDC, and send the average of network speeds to the QoS center;
    the QoS center is adapted to, according to the average of network speeds from all network users in each subnet to each IDC and a predetermined principle of allocating QoS levels, allocate a QoS level to a communication link from each subnet to each IDC, and send the QoS level of the communication link from each subnet to each IDC to the game server in each IDC; and
    the game server is adapted to determine a subnet to which a game client logging on the game server belongs, and send information of a recommended game room according to the determined subnet and the QoS level of the communication link from each subnet to each IDC.

7. The system of claim 6, further comprising a game client; wherein
    the game client is adapted to report to the QoS center on at least one of an offline rate and a network delay from the game client to the game server in each IDC; and
    the QoS center is adapted to allocate the QoS level to the communication link from the subnet to each IDC according to the average of network speeds from all network users in each subnet to each IDC and the at least one of the offline rate and the network delay.

8. The system of claim 7, wherein
the game server is further adapted to receive a request of obtaining a game room list from the game client, and identify each game room with a QoS level according to a subnet to which the game client belongs, the IDC to which each game room belongs and the QoS level of the communication link from each subnet to each IDC, and send the game room list in which game rooms are identified QoS levels to the game client, or recommend a game room of which QoS level meets a predetermined condition to the game client.

9. The system of claim 7, wherein
the QoS center is further adapted to modify dynamically at least one of the predetermined principle and the QoS level according to a network state from each subnet to each IDC.

10. A computer providing a game server for recommending a game room, comprising a Quality of Service (QoS) level storing module and a game room recommending module; wherein
the QoS level storing module is adapted to receive and store a QoS level of a communication link from each subnet to each IDC; and
the game room recommending module is adapted to receive a request of obtaining a game room list from a game client, and identify each game room with a QoS level according to a subnet to which the game client belongs, the IDC to which each game room belongs and the QoS level of the communication link from each subnet to each IDC, and send the game room list in which game rooms are identified with QoS levels to the game client.

* * * * *